US009792123B2

(12) United States Patent
Manoukian

(10) Patent No.: US 9,792,123 B2
(45) Date of Patent: Oct. 17, 2017

(54) INDIRECT BRANCH PREDICTION

(71) Applicant: IMAGINATION TECHNOLOGIES, LTD., Kings Langley (GB)

(72) Inventor: Manouk Manoukian, Hemel Hempstead (GB)

(73) Assignee: Imagination Technologies LImited, Kings Langley (GB)

( * ) Notice: Subject to any disclaimer, the term of this patent is extended or adjusted under 35 U.S.C. 154(b) by 6 days.

(21) Appl. No.: 14/169,771

(22) Filed: Jan. 31, 2014

(65) Prior Publication Data

US 2014/0281441 A1  Sep. 18, 2014

(30) Foreign Application Priority Data

Mar. 13, 2013  (GB) .................................. 1304504.2

(51) Int. Cl.
*G06F 9/38* (2006.01)
(52) U.S. Cl.
CPC .......... *G06F 9/3844* (2013.01); *G06F 9/3806* (2013.01); *G06F 9/3848* (2013.01)
(58) Field of Classification Search
CPC .................................................... G06F 9/3844
See application file for complete search history.

(56) References Cited

U.S. PATENT DOCUMENTS

| 2008/0256347 | A1* | 10/2008 | Eickemeyer et al. ........ 712/240 |
| 2010/0161950 | A1 | 6/2010 | Caprioli et al. |
| 2011/0289300 | A1* | 11/2011 | Beaumont-Smith .. G06F 9/3806 712/205 |

FOREIGN PATENT DOCUMENTS

| CN | 1397880 A | 2/2003 |
| CN | 102156636 A | 8/2011 |
| CN | 102934075 A | 2/2013 |

OTHER PUBLICATIONS

Combined Search and Examination Report Under Sections 17 and 18(3), dated Oct. 2, 2013, cited in Application GB 1304504.2 (5pgs).
McFarling "Combining Branch Predictors", WRL Technical Note, TN-36, Digital Equipment Corporation, 1993. URL: http://www.hpl.hp.com/techreports/Compaq-DEC/WRL-TN-36.pdf.

(Continued)

*Primary Examiner* — John Lindlof
(74) *Attorney, Agent, or Firm* — Vorys, Sater, Seymour and Pease LLP; Vincent M DeLuca

(57) ABSTRACT

Methods and indirect branch predictor logic units to predict the target addresses of indirect branch instructions. The method comprises storing in a table predicted target addresses for indirect branch instructions indexed by a combination of the indirect path history for previous indirect branch instructions and the taken/not-taken history for previous conditional branch instructions. When a new indirect branch instruction is received for prediction, the indirect path history and the taken/not-taken history are combined to generate an index for the indirect branch instruction. The generated index is then used to identify a predicted target address in the table. If the identified predicted target address is valid, then the target address of the indirect branch instruction is predicted to be the predicted target address.

20 Claims, 11 Drawing Sheets

(56) References Cited

OTHER PUBLICATIONS

Nair "Dynamic Path-based Branch Correlation" Proceedings of the 28th Annual International Symposium on Microarchitecture. Micro 28. Ann Arbor, Michigan, USA : IEEE Computer Society Press, 1995. S. 15-23.—ISBN 0-8186-7349-4. http://dl.acm.org/citation.cfm?id=225160.225168.

Driesen et al. "Limits of Indirect Branch Prediction" Technical Report TRCS97-10, University of California at Santa Barbara, 1997. URL: http://www.cs.ucsb.edu/-urs/oocsb/papers/TRCS97-10.pdf.

Chang et al. "Target Prediction for Indirect Jumps" Proceedings of the 24th Annual International Symposium on Computer Architecture. ISCA '97. New York, NY, USA : ACM, 1997. S. 274-283.—ISBN 0-89791-901-7. http://doi.acm.org/10.1145/264107.264209.

Driesen et al. "Accurate Indirect Branch Prediction" Technical Report TRCS97-19, Computer Science Department, University of California, Santa Barbara, 1998. URL: http://www.cs.ucsb.edu/-urs/oocsb/papers/TRCS97-19.html.

Branch predictor. In: Wikipedia, the free encyclopedia. Bearbeitungsstand: Feb. 25, 2013. URL: https://en.wikipedia.org/w/index.php?title=Branch_predictor&oldid=540346901#Two-level_adaptive_predictor.

\* cited by examiner

INDIRECT BRANCH PREDICTION

BACKGROUND

Many processors comprise a branch predictor which predicts which direction the program flow will take in the case of instructions known to cause possible flow changes, such as branch instructions. Branch prediction is useful as it enables instructions to be speculatively executed by the processor before the outcome of the branch instruction is known.

Branch instructions may be classified as conditional or indirect. Conditional branch instructions (branch instructions based on a constant value) require a binary decision as to whether the branch is taken or not-taken. Indirect branch instructions (branch instructions based on a variable) require an N-ary decision as to the target address where N is the number of possible target addresses. Accordingly indirect branches are more difficult to predict than conditional branches. As a result, many branch predictors are unable to accurately predict indirect branch instructions.

One solution to this has been to improve the indirect branch prediction algorithm used by the branch predictor. However, this is often quite difficult and time intensive.

The embodiments described below are not limited to implementations which solve any or all of the disadvantages of known processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and indirect branch predictor logic units to predict the target addresses of indirect branch instructions. The method comprises storing in a table predicted target addresses for indirect branch instructions indexed by a combination of the indirect path history for previous indirect branch instruction targets and the taken/not-taken history for previous conditional branch instructions. When a new indirect branch instruction is received for prediction, the indirect path history and the taken/not-taken history are combined to generate an index for the indirect branch instruction. The generated index is then used to identify a predicted target address in the table. If the identified predicted target address is valid, then the target address of the indirect branch instruction is predicted to be the predicted target address.

A first aspect provides a method to predict a target address of an indirect branch instruction in a program executed by a processor, the method comprising: storing in an indirect branch predicted target table a plurality of predicted target addresses for indirect branch instructions, each predicted target address being indexed by a combination of an indirect path history and a taken and not-taken history; receiving at an index generator information identifying an indirect branch instruction; obtaining at the index generator an indirect path history and a taken and not-taken history; combining at the index generator the indirect path history and the taken and not-taken history to generate an index for the identified indirect branch instruction; identifying a predicted target address in the indirect branch predicted target table using the index for the identified indirect branch instruction; if the identified predicted target address is valid, predicting the target address of the identified indirect branch instruction to be the identified predicted target address.

A second aspect provides an indirect branch predictor logic unit to predict a target address of an indirect branch instruction in a program executed by a processor, the indirect branch predictor logic unit comprising: an indirect branch predicted target table configured to store a plurality of predicted target addresses for indirect branch instructions, each predicted target address being indexed by a combination of an indirect path history and a taken and not-taken history; an index generator in communication with the indirect branch predicted target table, the index generator configured to: receive information identifying an indirect branch instruction; obtain an indirect path history and a taken and not-taken history; combine the indirect path history and the taken and not-taken history to generate an index for the identified indirect branch instruction; and a decision logic unit in communication with the indirect branch predicted target table, the decision logic unit configured to: identify a predicted target address of the indirect branch predicted target table using the index for the identified indirect branch; if the identified predicted target address is valid, predict the target address of the identified indirect branch instruction to be the identified predicted target address.

A third aspect provides a processor comprising the indirect branch predictor logic unit of the second aspect.

A fourth aspect provides a computer readable storage medium having encoded thereon computer readable program code for generating a processor comprising the indirect branch predictor logic unit of the second aspect.

A fifth aspect provides a computer readable storage medium having encoded thereon computer readable program code for generating a processor configured to perform the method of the first aspect.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
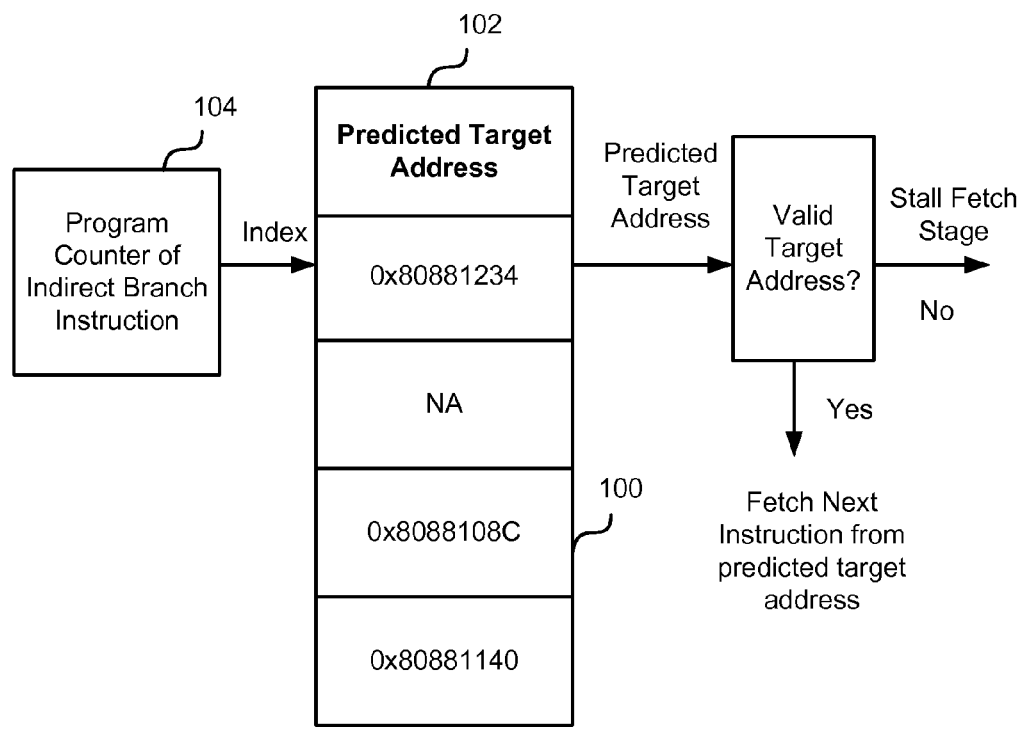
FIG. 1 is a schematic diagram of an example known branch target buffer table.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, indirect branches (e.g. branches based on a variable rather than a constant value) are difficult to predict as the branch predictor must predict where the target will be. The target is particularly difficult to predict because it is typically based on a register value that is periodically changing.

The most common way to predict indirect branches is to use a branch target buffer (BTB) which stores the most recent target address of indirect branch instructions. Reference is now made to FIG. 1 which illustrates an example BTB 100. The BTB 100 is a table which stores predicted target addresses 102 for indirect branch instructions. The table is indexed by the address (e.g. program counter (PC)) of the indirect branch instruction. Generally the address (e.g. or part thereof) 104 for an indirect branch instruction is used to generate an index that points to an entry in the BTB 100. The predicted target address stored at that entry is then output. If the predicted target address is valid the processor fetches the next instruction from the predicted target address. If the predicted target address is not valid then the fetch stage may be stalled until the actual target address is determined by the pipelines.

In some cases, the predicted target address is updated after each execution of an indirect branch instruction. For example, after an indirect branch instruction has been executed by the pipelines, the pipelines may provide the branch predictor with the program counter of the instruction that followed the indirect branch instruction. The branch predictor may then replace the predicted target value in the BTB 100 with the received program counter.

In other cases, the BTB 100 may comprise a two bit counter for each indirect branch instruction which keeps track of the number of mis-predictions for the indirect branch instruction. In these cases, the predicted target address may only be updated after two consecutive mis-predictions. This variant on the standard BTB is sometimes referred to as BTB-2BC (branch target buffer—two bit counter).

Another way to predict indirect branches is to use a two-level predictor where the target addresses in the prediction table are indexed by a combination (e.g. hashing) of both the address (e.g. program counter) of the indirect branch instruction and history information for previous branch instructions. The history information provides a path of how the program arrived at the indirect branch instruction. The history information may be the indirect path history or the taken/not-taken history. The goal of a two-level predictor is to map branch execution patterns to branch targets to allow the prediction to use past behavior to enhance the prediction.

The indirect path history is a history of the previous indirect branch instruction targets. In particular, the indirect path history comprises the target addresses (or a portion thereof) of the N preceding indirect branch instructions where N is the path length. For example, the indirect path history may comprise the last four bits of the target addresses (e.g. PCs) of the four preceding indirect branch instructions. The left-most bits may represent the target address of the oldest indirect branch instruction in the history and the right-most bits may represent the target address of the youngest indirect branch instruction in the history.

The taken/not-taken history (which also may be referred to as the "taken and not-taken history") is a history of the outcome of the previous conditional branches. In particular, the taken/not-taken history comprises the outcome (taken/not-taken) of the M preceding conditional branches where M is the path length. For example, the taken/not-taken history may have a path length of twelve and each of the twelve bits indicates whether a conditional branch was taken or not taken. A zero ("0") may indicate that the conditional branch was not taken and a one ("1") may indicate that the conditional branch was taken. The left-most bit may represent the oldest taken/not-taken decision in the history and the right-most bit may represent the youngest taken/not-taken decision in the history.

Figure 2:
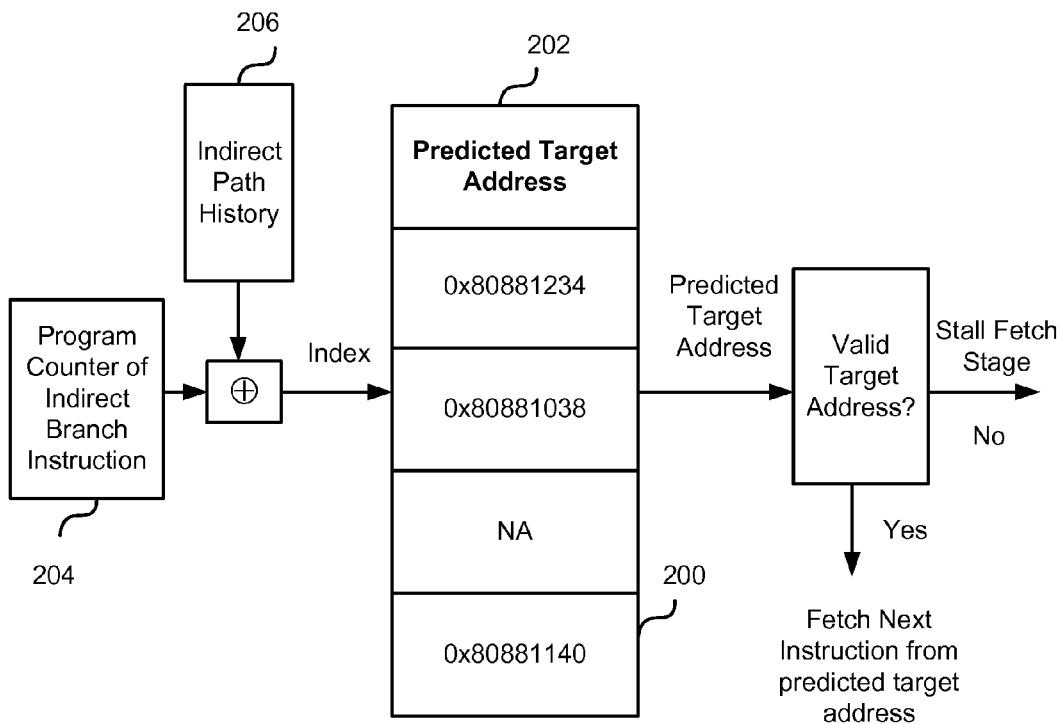
FIG. 2 is a schematic diagram of an example known two-level branch prediction table.

Reference is now made to FIG. 2 which illustrates an example two-level branch prediction table 200. The two-level branch prediction table 200, like the BTB 100 of FIG. 1, is a table which stores predicted target addresses 202 for indirect branch instructions. However, instead of being indexed by the address (e.g. PC) of the indirect branch instruction alone, the table 200 is indexed by a combination of the address (e.g. PC) of the indirect branch instruction and the indirect path history. Generally the address (or part thereof) 204 of an indirect branch instruction is combined (e.g. exclusive-or'd) with the indirect path history 206 to generate an index that points to an entry in the two-level branch prediction table 200. The predicted target address stored at that entry is then output. If the predicted target address is valid the processor fetches the next instruction from the predicted target address. If the predicted target address is not valid then the fetch stage may be stalled until the actual target address is determined by the pipelines.

It has been identified, however, that better indirect branch prediction compared to BTB, BTB-2BC, and two-level branch prediction can be achieved by indexing the target addresses in a prediction table using a combination of the indirect path history and the taken/not-taken history. In particular, it has been identified that the target address of an indirect branch instruction is not only dependent on the preceding indirect branch instructions, but also the preceding conditional branch instructions. This is because it is the indirect history and the conditional history together that indicate the full path taken to get to the indirect branch instruction. Accordingly, relying on only one or the other will not provide a full picture of the path taken.

One might think then that it would be beneficial to combine the indirect path history, the taken/not-taken history and the address of the branch instruction. However, this triple combination tends to lose it correlation as the important information gets lost in the combination. To resolve this problem, it has been identified, in contrast to current thinking, that the target address of an indirect branch instruction is not highly dependent on the address of the indirect branch instruction and thus it can be accurately predicted without it or using only a portion of it.

Accordingly, embodiments described herein relate to methods and branch predictors wherein the target address for an indirect branch instruction is predicted based on a combination of the indirect path history and the taken/not-taken history.

Figure 3:
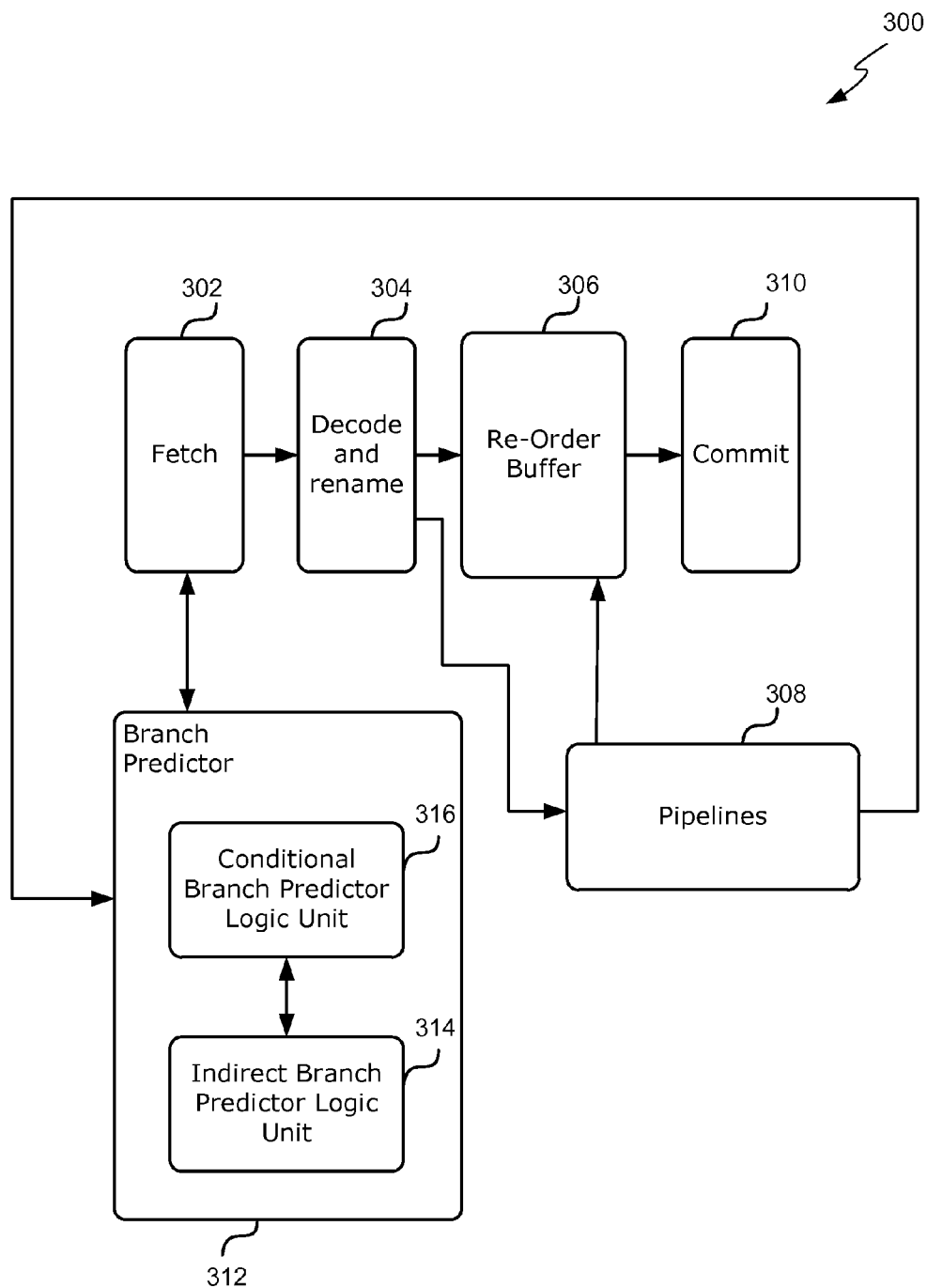
FIG. 3 is a schematic diagram of an example single-threaded processor.

Reference is now made to FIG. 3 which illustrates a single-threaded processor 300 where the target address for an indirect branch instruction is predicted using the indirect path history and the taken/not-taken history. The processor 300 comprises a fetch stage 302 configured to fetch instructions from a program (in program order) as indicated by a program counter (PC) and a decode and renaming stage 304 arranged to interpret the instructions and perform register renaming.

After an instruction passes through the decode and renaming stage 304, it is (a) inserted into a re-order buffer 306 (ROB) and (b) dispatched to the pipelines 308 for execution.

The re-order buffer 306 is a buffer that enables the instructions to be executed out-of-order, but committed in-order. The re-order buffer 306 holds the instructions that are inserted into it in program order, but the instructions within the ROB 306 can be executed out of sequence by the plurality of pipelines 308. In some examples, the re-order buffer 306 can be formed as a circular buffer having a head pointing to the oldest instruction in the ROB 306, and a tail pointing to the youngest instruction in the ROB 306. Instructions are output from the re-order buffer 306 in program order. In other words, an instruction is output from the head of the ROB 306 when that instruction has been executed by the pipelines 308, and the head is incremented to the next instruction in the ROB 306. Instructions output from the re-order buffer 306 are provided to a commit stage 310, which commits the results of the instructions to the register/memory.

The processor 300 also comprises a branch predictor 312, which is configured to predict which direction the program flow will take in the case of instructions known to cause possible flow changes, such as branch instructions. Branch prediction is useful as it enables instructions to be speculatively executed by the processor 300 before the outcome of the branch instruction is known. The branch predictor 312 may be in communication with the fetch stage 302 and/or the pipelines 308. For example, the fetch stage 202 may provide information to the branch predictor 312 indicating which instructions are branch instructions and may use information from the branch predictor 312 to determine which instruction to fetch next; and the pipelines 308 may provide the branch predictor 312 with information indicating updates to the program counter.

When the branch predictor 312 predicts the program flow accurately, this improves performance of the processor 300. However, if the branch predictor 312 does not correctly predict the branch direction, then a mis-prediction occurs which needs to be corrected before the program can continue. To correct a mis-prediction, the speculative instructions sent to the ROB 306 are abandoned, and the fetch stage 302 starts fetching instructions from the correct program branch.

The branch predictor 312 comprises an indirect branch predictor logic unit 314 for predicting indirect branches (branch instructions based on a variable) and a conditional branch predictor logic unit 316 for predicting conditional branches (branch instructions based on a constant).

The indirect branch predictor logic unit 314 predicts the target address of indirect branch instructions using a combination of the indirect branch history for previous indirect branch instructions and the taken/not-taken history for previous conditional branch instructions. An example indirect branch predictor logic unit 314 is described with reference to FIG. 4.

The conditional branch predictor logic unit 316 predicts whether a conditional branch will be taken or not-taken using any known method.

Figure 4:
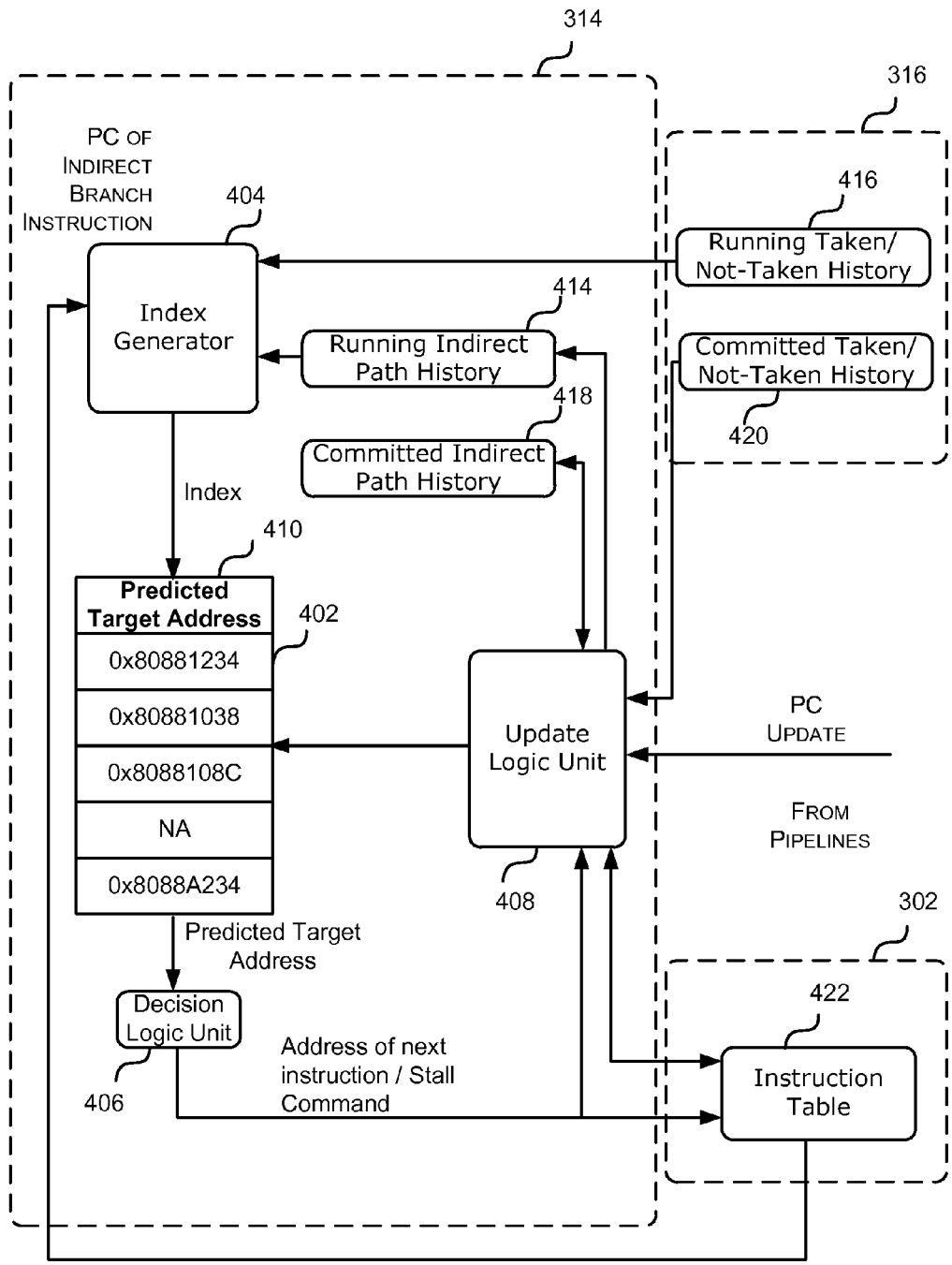
FIG. 4 is a schematic diagram of an example indirect branch prediction logic unit of FIG. 3.

Reference is now made to FIG. 4 which illustrates an example indirect branch predictor logic unit 314 of FIG. 3. The indirect branch predictor logic unit 314 predicts the target address of indirect branch instructions using a combination of the indirect branch history and the taken/not-taken history (conditional branch outcome history).

The example indirect branch prediction logic unit 314 of FIG. 4 comprises an indirect branch predicted target table 402 for storing predicted target addresses indexed by a combination of the indirect branch history and the taken/not-taken history; an index generator 404 in communication with the indirect branch predicted target table 402 for generating an index for an indirect branch instruction; and a decision logic unit 406 in communication with the indirect branch predicted target table 402 for predicting the address of the next instruction (e.g. target address) based on the predicted target address identified by the index generated by the index generator 404; and an update logic unit 408 in communication with the decision logic unit 406 and the indirect branch predicted target table 402 for updating the indirect branch history and/or the indirect branch predicted target table 402.

The indirect branch predicted target table 402, like the BTB 100 of FIG. 1 and the two-level branch prediction table 200 of FIG. 2, is a table which stores predicted target addresses 410 for indirect branch instructions. However, instead of being indexed by the address (e.g. PC) of the indirect branch instruction alone, or a combination of the address (e.g. PC) of the indirect branch instruction and the indirect path history, the predicted target addresses 410 are indexed by a combination of the indirect path history 414 and the taken/not-taken history 416.

The indirect path history 414 is a record of target addresses (or part thereof) of previous indirect branch instructions. The number of target addresses (or part thereof) stored in the indirect path history is referred to as the path length. For example, if the path length of the indirect path history 414 is three, then the indirect path history records the target addresses (or part thereof) of the three preceding indirect branch instructions. The path length may be selected based on the size of the indirect branch predicted target table 402. For example, if there are 1024 entries in the indirect branch predicted target table 402, the indirect path history may comprise 10 ($2^{10}$=1024) bits. Example indirect path histories 414 are described with reference to FIG. 5.

In some cases, as shown in FIG. 4, the indirect branch predictor logic unit 314 generates and stores two versions of the indirect path history—a running or predictive indirect path history 414 and a committed indirect path history 418. The running or predictive indirect path history 414 stores the predicted target addresses (or part thereof) of the most recently predicted indirect branch instructions. The running or predictive indirect path history 414 is updated after the decision logic unit 406 has predicted the target address for an indirect branch instruction. In contrast, the committed indirect path history 418 stores the actual target addresses (or part thereof) of the most recently committed indirect branch instructions. The committed indirect path history 418 is updated after the update logic unit 408 receives information from the pipelines 308 indicating the actual target addresses of indirect branch instructions (e.g. after the branch instructions have been resolved). The process of updating the indirect path histories 414 and 418 is described in further detail below with reference to the update logic unit 408.

The running or predictive indirect path history 414 is used to predict the target address of an indirect branch instruction. This allows the indirect branch predictor logic unit 314 to look much further ahead in the instruction set than the executed instructions. The committed indirect path history 418 is used to generate the indexes used to update the indirect branch predicted target table 402. The committed indirect path history 418 may also be used to repair (e.g. overwrite) the running indirect path history 414 when there has been a mis-prediction In some cases, the indirect path histories 414 and 418 may be implemented as shift registers.

In the examples described herein the indirect path histories 414 and 418 are global, meaning that there is only one set of indirect path histories 414 and 418 for all indirect branch instructions. In particular, the target addresses (predicted or actual) for all indirect branch instructions are stored in the same indirect path history. However, in other examples, the indirect path histories 414 and 418 may be specific to a particular indirect branch instruction or to a set of indirect branch instructions. For example, if an indirect path history is specific to a particular indirect branch instruction it comprises only the target addresses (predicted or actual) for the specific indirect branch instruction. In these examples, there are several sets of indirect path histories 414 and 418 (e.g. one for each particular indirect branch instruction or one for each set of branch instructions) and there are several indirect branch predicted target tables (e.g. one for each particular indirect branch instruction or one for each set of branch instructions).

The taken/not-taken history 416 is a record of whether previous conditional branch instructions were taken or not taken. The number of conditional branch outcomes (taken/not-taken) stored in the taken/not-taken history 416 is referred to as the path length. For example, if the path length of the taken/not-taken history 416 is ten, then the taken/not-taken history 416 records the outcome of the ten previous conditional branch instructions. The path length of the taken/not-taken history 416 may be selected based on the size of the indirect branch predicted target table 402. For example, if there are 1024 entries in the indirect branch predicted target table 402, the number of bits in the taken/not-taken history 416 may be 10 ($2^{10}$=1024) bits. Example taken/not-taken histories are described with reference to FIG. 6.

The taken/not-taken history 416 is typically generated by the conditional branch predictor logic unit 316. Similar to the indirect path history, the conditional branch predictor logic unit 316 may generate and store two versions of the taken/not-taken history—a running or predictive taken/not-taken history 416 and a committed taken/not-taken history 420. The running or predictive taken/not-taken history 416 stores the predicted outcome (taken/not-taken) of the most recently predicted conditional branch instructions. The running or predictive taken/not-taken history 416 is updated after the conditional branch instruction logic unit 316 has predicted whether the branch will be taken or not-taken. In contrast, the committed taken/not-taken history 420 stores the actual outcome (taken/not-taken) of the most recently committed conditional branch instructions. The committed indirect path history 420 is updated after the conditional branch prediction logic unit 316 receives information from the pipelines 308 indicating whether a conditional branch was actually taken or not-taken.

The running or predictive taken/not-taken history 416 is used to predict the target address of an indirect branch instruction. This allows the indirect branch predictor logic unit 314 to look much further ahead in the instruction set than the executed instructions. The committed taken/not-taken history 420 is used to update the indirect branch predicted target table 402. The committed taken/not-taken history 420 may also be used to repair (e.g. overwrite a portion of) the running taken/not-taken history 416 when there has been a mis-prediction.

In some cases, the taken/not-taken histories 416 and 420 may be implemented as shift registers.

In the examples described herein the taken/not-taken histories 416 and 420 are global, meaning that there is only one set of taken/not-taken histories 416 and 420 for all conditional branch instructions. In particular the outcome of all conditional branch instructions are stored in the same taken/not-taken history However, other examples, the taken/not-taken histories 416 and 420 may be specific to a particular conditional branch instruction or to a set of conditional branch instructions. In these examples, there are several sets of taken/not-taken histories, one for each particular conditional branch instruction or one for each set of conditional branch instructions. In cases where there is one taken/not-taken history for each particular conditional branch or one for each set of conditional branch instructions, the address (or part thereof) of the indirect branch instruction may be used to select which taken/not-taken histories are used to generate the index.

The indirect path history 414 or 418 and the taken/not-taken history 416 or 420 may be combined in any suitable manner to generate the indexes. In some cases a hash function is performed on a number of bits of the indirect path history 414 or 418 and a number of bits of the taken/not-taken history 416 or 420. For example, a bit-wise exclusive-or (XOR) function may be performed on the indirect path history 414 or 418 and the taken/not-taken history 416 or 418 where each bit of the indirect path history 414 or 418 is XOR'd with a corresponding bit of the taken/not-taken history 416 or 420.

It will be evident to a person of skill in the art that other combinations and/or hash functions may be used. For example, the hash function may select some bits from one history and some from another history and perform an XOR operation on the selected bits; or the hash function may XOR the bits of the histories in a different order.

The index generator 404 is responsible for generating an index for indirect branch instructions received from the fetch stage 302. For example, the index generator 404 may receive information from the fetch stage 302 identifying an indirect branch instruction in the program. In some cases the information identifying the indirect branch instruction is the address (program counter) of the indirect branch instruction. The index generator 404 then obtains the running indirect path history 414 and the running taken/not-taken history 416 and combines them to generate an index for the indirect branch instruction. As described above, the running indirect path history 414 and the running taken/not-taken history 416 may be combined in any suitable manner (e.g. bit-wise XOR'd).

In some cases, the index generator 404 may modify one of the running indirect path history 414 and the running taken/not-taken history 416 to comprise the address (or part thereof) of the indirect branch instruction prior to combining the histories to generate the index. For example, the index generator 404 may append the last four bits of the address of the indirect branch instruction to the running taken/not-taken history 416 prior to combining it with the running indirect path history 414. In another example, the index generator 404 may replace the top four bits of the running taken/not-taken history 416 with the last four bits of the address of the indirect branch instruction prior to combining it with the running indirect path history 414.

Once the index generator 404 has generated the index for an indirect branch instruction it is used to identify a particular entry in the indirect branch predicted target table 402. In some cases the index will identify only one entry in the indirect branch predicted target table 402. This may occur, for example, where there are $2^X$ entries (e.g. rows) in the indirect branch predicted target table 402 and there are X bits in the index.

In other cases the index may identify more than one entry in the table. This may occur, for example, where there are $2^X$ entries (e.g. rows) in the indirect branch predicted target table 402 and there are less than X bits in the index. In these cases, the indirect branch predicted target table 402 may comprise an additional tag column (not shown) that is used to uniquely identify a particular entry. The tag may be the address (or a part thereof) of the indirect branch instruction. In these cases when the index identifies more than one entry in the indirect branch predicted target table 402, the tag for each of the identified entries may be compared to the address (or part thereof) of the indirect branch instruction to determine if there is a match. If there is a match then the matching entry is selected. If there is no match then it may be deemed that there is not a valid predicted target address for the index.

The predicted target address in the entry identified by the index is provided to the decision logic unit 406 which determines whether the received predicted target address is valid. A particular predicted target address may not be valid if a predicted target address has not been generated for the particular index (e.g. an update has not happened yet for that entry); or in cases where a tag column is used and there is no entry with a matching tag. If the decision logic unit 406 determines that the predicted target address is valid then the decision logic unit 406 predicts the target address of the indirect branch instruction to be the predicted target address.

The decision logic unit 406 then sends an indication to the fetch stage 302 that it should fetch the next instruction from the predicted target address. If, however, the decision logic unit 406 determines the predicted target address is not valid then it may send an indication to the fetch stage 302 to stall until the actual target address has been determined by the pipelines 308.

The decision logic unit 406 also provides any valid predicted target address to the update logic unit 408. The update logic unit 408 then updates the running indirect path history 414 to indicate that the most recently predicted target address is the predicted target address received from the decision logic unit 406. Where the running indirect path history 414 is implemented as a shift register this may comprise shifting the bits in the register a predetermined number of bits and inserting the received predicted address (or part thereof) in the free bits.

The update logic unit 408 is also configured to receive information from the pipelines 308 when an indirect branch prediction has been executed and committed. The information may comprise the address (e.g. program counter) of the indirect branch instruction and the actual target address (e.g. the update to the program counter). Upon receiving information from the pipelines 308 about a particular indirect branch instruction, the update logic unit 408 may be configured to: (a) update the indirect branch predicted target address table 402 to reflect the actual target address; (b) update the committed indirect path history 418; and/or (c) correct the running indirect path history 414 if the received information indicates there was a mis-prediction.

Updating the indirect branch predicted target table 402 may comprise generating an index from the committed indirect path history 418 and the committed taken/not-taken history 420 in the same manner as the index generator 404. As described above, the histories may be combined in any suitable manner to generate the index. In some cases a hash function is performed on a number of bits of the committed indirect path history 418 and a number of bits of the committed taken/not-taken history 420. For example, a bit-wise exclusive-or (XOR) function may be performed on the committed indirect path history 418 and the committed taken/not-taken history 420 where each bit of the committed indirect path history 418 is XOR'd with a corresponding bit of the committed taken/not-taken history 420.

Once the index has been generated it is used to identify an entry (i.e. row) in the indirect branch predicted target address table 402. In some cases the predicted target address in the identified entry is then replaced with the actual target address received from the pipelines 308. In other cases, the predicted target address in the identified entry is only replaced with the actual target address after that entry has caused a predetermined number of mis-predictions. For example, the indirect branch predicted target table 402 may comprise a two-bit counter (not shown) for each entry which keeps track of the number of mis-predictions caused by that entry. The update logic unit 408 may then only replace the predicted target address with the actual target address if the two-bit counter indicates that the entry has caused, for example, two consecutive mis-predictions.

An example method for updating the indirect branch predicted target table 402 which may be executed by the update logic unit 408 is described with reference to FIG. 10.

Updating the committed indirect path history 418 may comprise updating the history 418 to indicate that the target address for the most recently executed indirect branch instruction is the actual target address received from the pipelines 308. Where the committed indirect path history 418 is implemented as a shift register this may comprise shifting the bits in the register a predetermined number of bits and inserting the actual target address (or part thereof) in the free bits of the register.

Correcting the running indirect path history may comprise first determining if the information received from the pipelines 308 indicates that there was a mis-prediction. Determining if the information received from the pipelines 308 indicates that there was a mis-prediction may comprise comparing the actual target address received from the pipelines 308 to the predicted target address recorded in the instruction table 422 for the indirect branch instruction identified by the pipelines 308. If the predicted target address and the actual target address do not match then there was a mis-prediction. If there was a mis-prediction then the update logic unit 408 replaces the running indirect path history 414 with the committed indirect path history 418. Although the committed indirect path history 418 is "behind" the running indirect path history 416 (i.e. it does not comprise the target addresses (or part thereof) of indirect branch instructions that have been predicted, but not committed), the mis-prediction causes a rewind of instructions to the mis-predicted instruction thus the predictions made after the mis-prediction become irrelevant and are discarded.

The indirect branch predicted target table 402, the index generator 404, the decision logic unit 406, the update logic unit 408, the running indirect path history 414 and the committed indirect path history 418 may be implemented using any suitable hardware.

Figure 5:
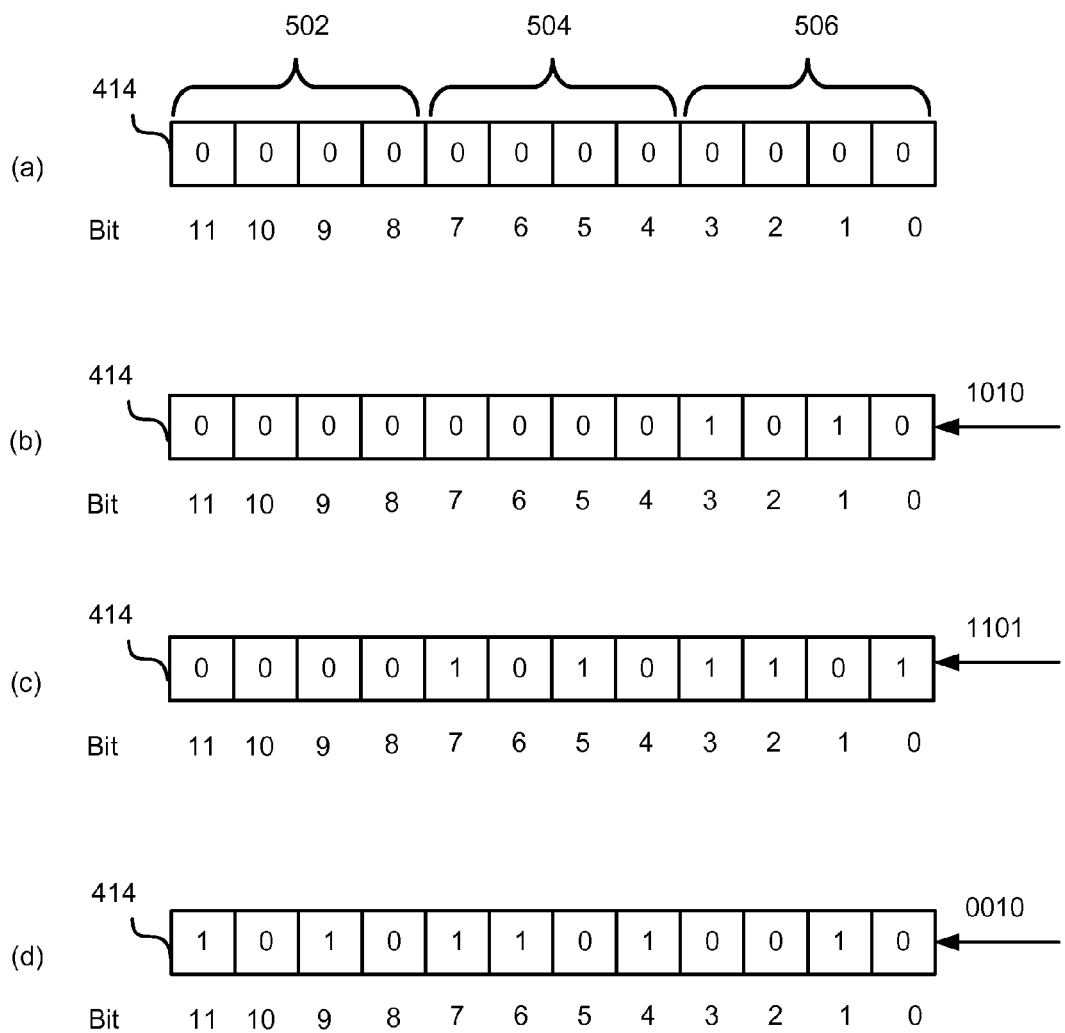
FIG. 5 is a schematic diagram of example indirect path histories.

Reference is now made to FIG. 5 which illustrates an example running indirect path history 414. As described above the running indirect path history 414 is a record of N target addresses (or part thereof) of previously predicted indirect branch instructions where N is the path length. For example, if N is five, then the indirect path history records the target addresses (or part thereof) of the five most recently predicted indirect branch instructions.

The example running indirect path history 414 of FIG. 5 is twelve bits long and has a path history, N, of three. Accordingly, the running indirect path history 414 records four bits of the target addresses of the three most recently predicted indirect branch instructions. In some cases it is the last four bits of the target addresses that are stored. In other cases it may be other bits of the target addresses that are stored. It will be evident to a person of skill in the art that the indirect path history may comprise more or fewer bits, may have a higher or lower path length (N), and may store more or fewer bits of the target addresses.

In this example the running indirect path history 414 is divided into three blocks 502, 504 and 506. The first block 502 corresponds to the most significant four bits (bits 8 to 11) and is used to store the last four bits of the target address of the third most recently predicted indirect branch instruction. The second block 504 corresponds to the middle four bits (bits 4-7) and is used to store the last four bits of the target address of the second most recently predicted indirect branch instruction. The third block 506 corresponds to the least significant four bits (bits 0 to 3) and is used to store the last four bits of the target address of the most recently predicted indirect branch instruction.

In some cases, the running indirect path history 414 is initially set to all zeros as shown in FIG. 5a and when the decision logic unit 406 predicts a new target address, the update logic unit 408 shifts the data in blocks 504 and 506 four bits to the left to blocks 502 and 504 respectively and the last four bits of the target address of the newly executed indirect branch instruction are inserted into block 506.

For example, if the update logic unit 408 receives information from the decision logic unit 406 that it has predicted the target address for a new indirect branch instruction is "011000001010" then the update logic unit 408 may shift the data "0000" and "0000" in blocks 504 and 506 to blocks 502 and 504 respectively and insert the last four bits of the target address "1010" into block 506 so that the running indirect path history 414 contains the data "000000001010" as shown in FIG. 5b.

If the update logic unit 408 subsequently receives information from the decision logic unit 406 indicating that it has predicted the target address for a new indirect branch instruction is "010100001101" then the update logic unit 408 may shift the data "0000" and "1010" in blocks 504 and 506 to blocks 502 and 504 respectively and insert the last four bits of the target address "1101" into block 506 so that the running indirect path history 414 contains the data "000010101101" as shown in FIG. 5c.

Similarly if the update logic unit 408 subsequently receives information from the decision logic unit 406 indicating that it has predicted the target address of a new indirect branch instruction is "101011100010" then the update logic unit 408 may shift the data "1010" and "1101" in blocks 504 and 506 to blocks 502 and 504 respectively and insert the last four bits of the target address "0010" into block 506 so that the running indirect path history 414 contains the data "101011010010" as shown in FIG. 5d.

Although FIG. 5 illustrates an example running indirect path history 414, the committed indirect path history 418 may have a similar structure and may be updated in a similar manner to the running indirect path history 414. However, instead of being updated when a target address for a new indirect branch instruction is predicted, the committed indirect path history 418 is updated after the update logic unit 408 receives information from the pipelines 308 that a new indirect branch instruction has been executed.

Figure 6:
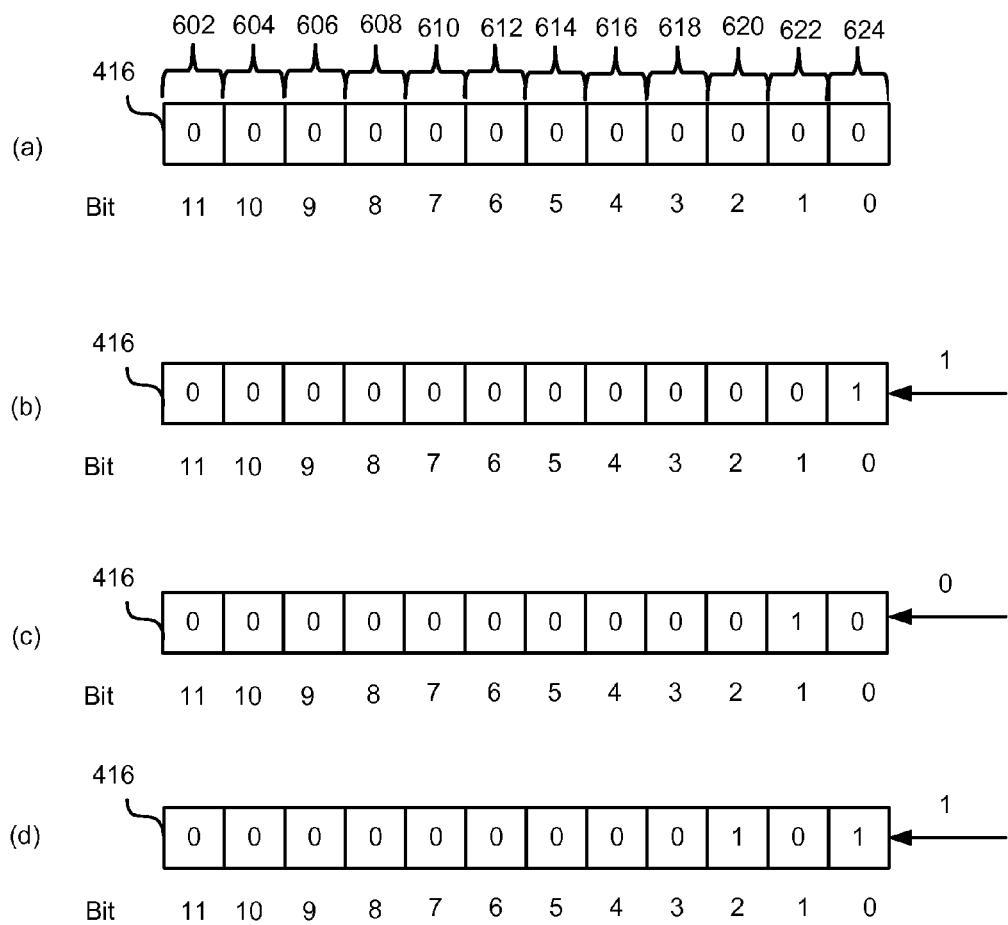
FIG. 6 is a schematic diagram of example taken/not-taken histories.

Reference is now made to FIG. 6 which illustrates example running taken/not-taken histories 416. As described above the running taken/not-taken history 416 is a record of the predicted outcome (taken/not-taken) of the M most recently predicted conditional branch instructions where M is the path length. For example, if M is five, then the running taken/not-taken history 416 records the predicted outcome of the five most recently predicted conditional branch instructions.

The example running taken/not-taken history 416 of FIG. 6 is twelve bits long and has a path length, M, of twelve. Accordingly, the running taken/not-taken history 416 uses one bit to record the outcome (taken/not-taken) of each of the twelve most recently predicted conditional branch instructions. In some cases a one ("1") is used to indicate that the branch was taken and a zero ("0") is used to indicate that the branch was not taken. It will be evident to a person of skill in the art that the indirect path history may comprise more or fewer bits, and may have a higher or lower path length (M).

In this example, the running taken/not-taken history 416 can be divided into twelve blocks 602-624 where each block is a single bit that represents the outcome of a recently predicted conditional branch. The blocks are in order of prediction of the corresponding conditional branch wherein the left-most block (block 602) represents the outcome of the oldest predicted conditional branch instruction in the history 416 and the right-most block (block 624) represents the outcome of the youngest (or most recently) predicted conditional branch instruction in the history 416.

In some cases, the running taken/not-taken history 416 is initially set to all zeros as shown in FIG. 6a and when the conditional branch predictor logic unit 316 predicts the outcome of a conditional branch instruction, the conditional branch predictor logic unit 316 shifts the data in blocks 604-624 one bit to the left to blocks 602-622 respectively and the predicted outcome for the new conditional branch instruction is inserted into block 624.

For example, if the conditional branch predictor logic unit 316 predicts that a conditional branch will be taken (e.g. the condition is "1") then the conditional branch predictor logic unit 316 may shift the data "00000000000" in blocks 604-624 to blocks 602-622 respectively and insert the predicted outcome ("1") into block 624 so that the running taken/not-taken history 416 contains the data "000000000001" as shown in FIG. 6b.

If the conditional branch predictor logic unit 316 then subsequently predicts that the next conditional branch will not be taken (e.g. the condition is "0") then the conditional branch predictor logic unit 316 may shift the data "00000000001" in blocks 604-624 to blocks 602-622 respectively and insert the predicted outcome ("0") into block 624 so that the running taken/not-taken history 416 contains the data "000000000010" as shown in FIG. 6c.

Similarly, if the conditional branch predictor logic unit 316 then subsequently predicts that the next conditional branch will be taken (e.g. the condition is "1") then the conditional branch predictor logic unit 316 may shift the data "00000000010" in blocks 604-624 to blocks 602-622 respectively and insert the predicted outcome ("1") into block 624 so that the running taken/not-taken history 416 contains the data "000000000101" as shown in FIG. 6d.

Although FIG. 6 illustrates an example running taken/not-taken history 416, the committed taken/not-taken history 420 may have a similar structure and may be updated in a similar manner to the running taken/not-taken history 416. However, as described above, instead of being updated when a conditional branch is predicted, the committed taken/not-taken history 420 is updated after the conditional branch predictor logic unit 316 receives information from the pipelines 308 that a conditional branch instruction has been executed.

Figure 7:
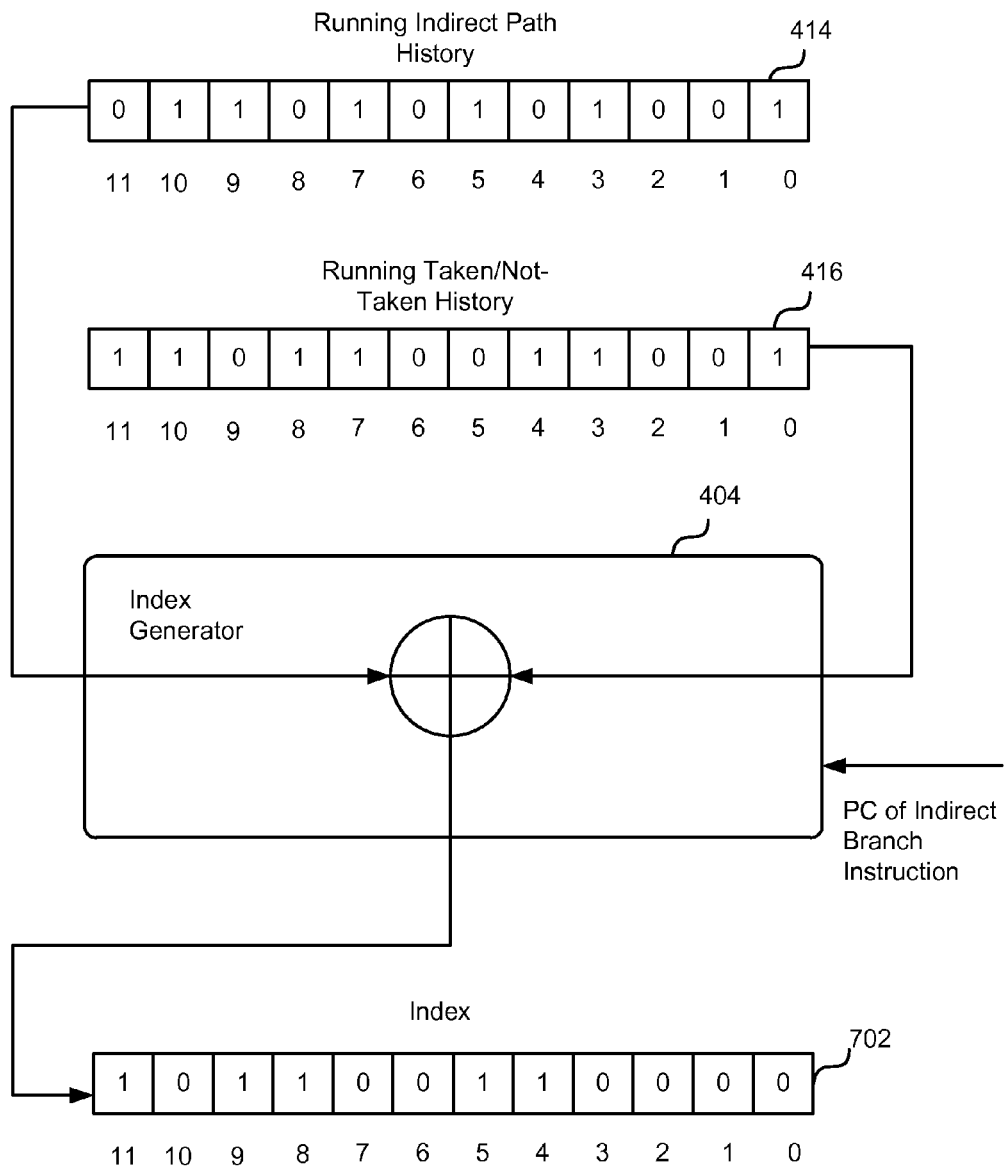
FIG. 7 is a schematic diagram of a first example index generator of FIG. 4.

Reference is now made to FIG. 7 which illustrates a first example index generator 404 of FIG. 4. As described above with reference to FIG. 4, the index generator 404 receives information from the fetch stage 302 identifying an indirect branch instruction in the program. In some cases the information identifying the indirect branch instruction is the address (e.g. program counter) of the indirect branch instruction. The index generator 404 then obtains the running indirect path history 414 and the running taken/not-taken history 416 and combines them to generate an index 702 for the indirect branch instruction.

In the example shown in FIG. 7 the index generator 404 performs a bit-wise exclusive-or (XOR) operation on the running indirect path history 414 and the running taken/not-taken history 416 to generate the index 702. As is known to those in the art bit-wise XOR produces a "0" if the two corresponding bits (e.g. bit 5 in the running indirect path history 414 and bit 5 in the running taken/not-taken history 416) are the same and produces a "1" if the two corresponding bits are different. For example, as shown in FIG. 7, where the running indirect path history 414 is "011010101001" and the running taken/not-taken history 416 is "110110011001" the resulting index 702 is "101100110000".

Figure 8:
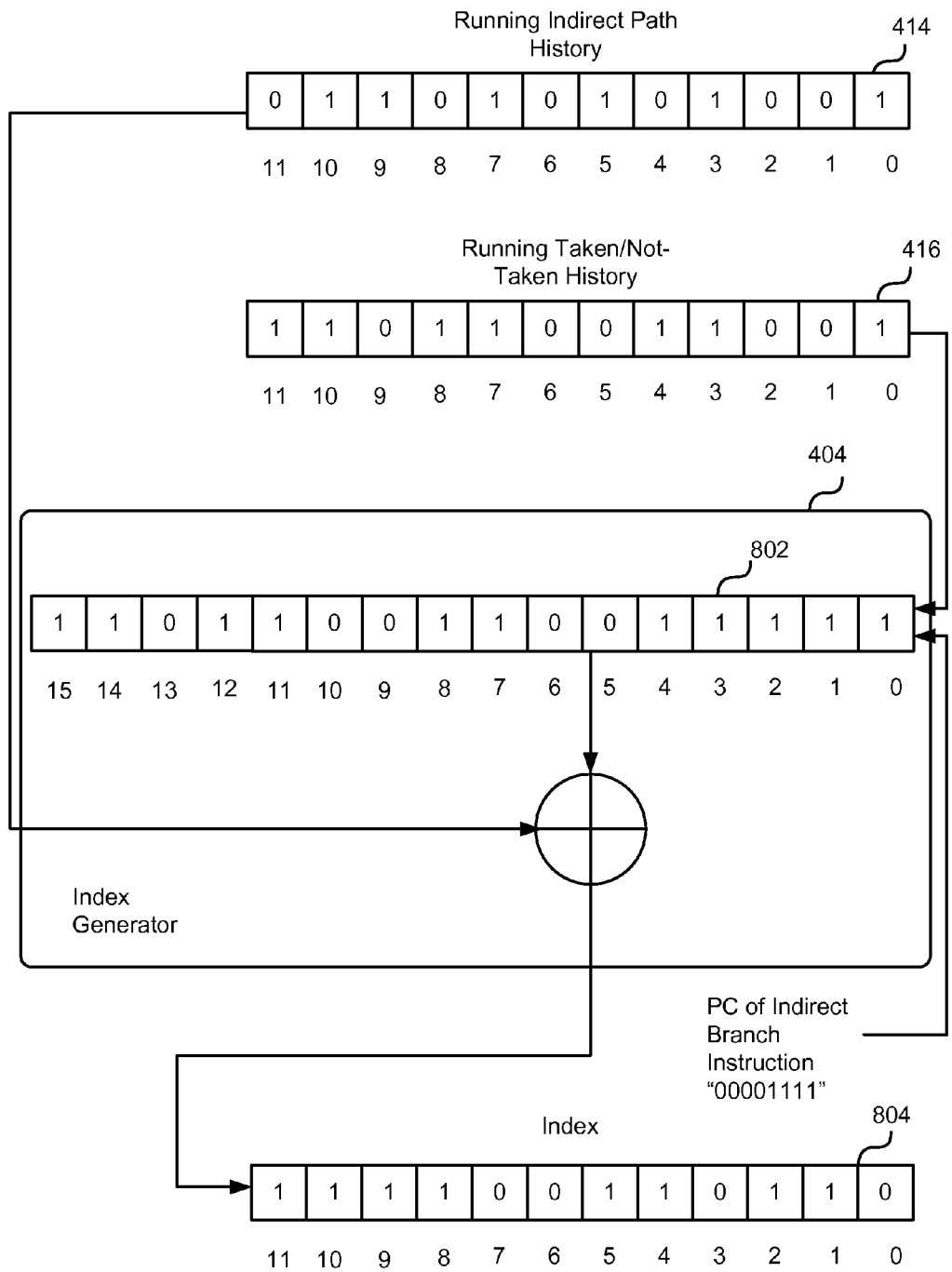
FIG. 8 is a schematic diagram of a second example index generator of FIG. 4.

Reference is now made to FIG. 8 which illustrates a second example index generator 404 of FIG. 4. As described above with reference to FIG. 4, the index generator 404 receives information from the fetch stage 302 identifying an indirect branch instruction in the program. In some cases the information identifying the indirect branch instruction is the address (e.g. program counter) of the indirect branch instruction. In the example shown in FIG. 8 the address of the indirect branch instruction is "00001111".

The index generator 404 then obtains the running indirect path history 414 and the running taken/not-taken history 416. The index generator 404 then appends the last four bits of the address of the branch instruction to the running taken/not-taken history 416 to generate a modified taken/not-taken history 802. For example, as shown in FIG. 8, where the running taken/not-taken history 416 is "110110011001" and the address of the indirect branch instruction is "00001111" the modified taken/not-taken history 802 becomes "1101100110011111".

The index generator 404 then combines the last twelve bits (bits 0 to 11) of the modified taken/not-taken history 802 and the running indirect path history 414 to generate an index 804 for the indirect branch instruction. In the example shown in FIG. 8 the index generator 404 performs a bit-wise exclusive-or (XOR) operation on the running indirect path history 414 and the last twelve bits (bits 0-11) of the modified taken/not-taken history 802 to generate the index 804. As is known to those in the art bit-wise XOR produces a "0" if the two corresponding bits (e.g. bit 5 in the running indirect path history 414 and bit 5 in the modified taken/not-taken history 802) are the same and produces a "1" if the two corresponding bits are different. For example, as shown in FIG. 8, where the running indirect path history 414 is "011010101001" and the last twelve bits (bits 0 to 11) of the modified taken/not-taken history 802 are "100110011111" the resulting index 804 is "111100110110".

Figure 9:
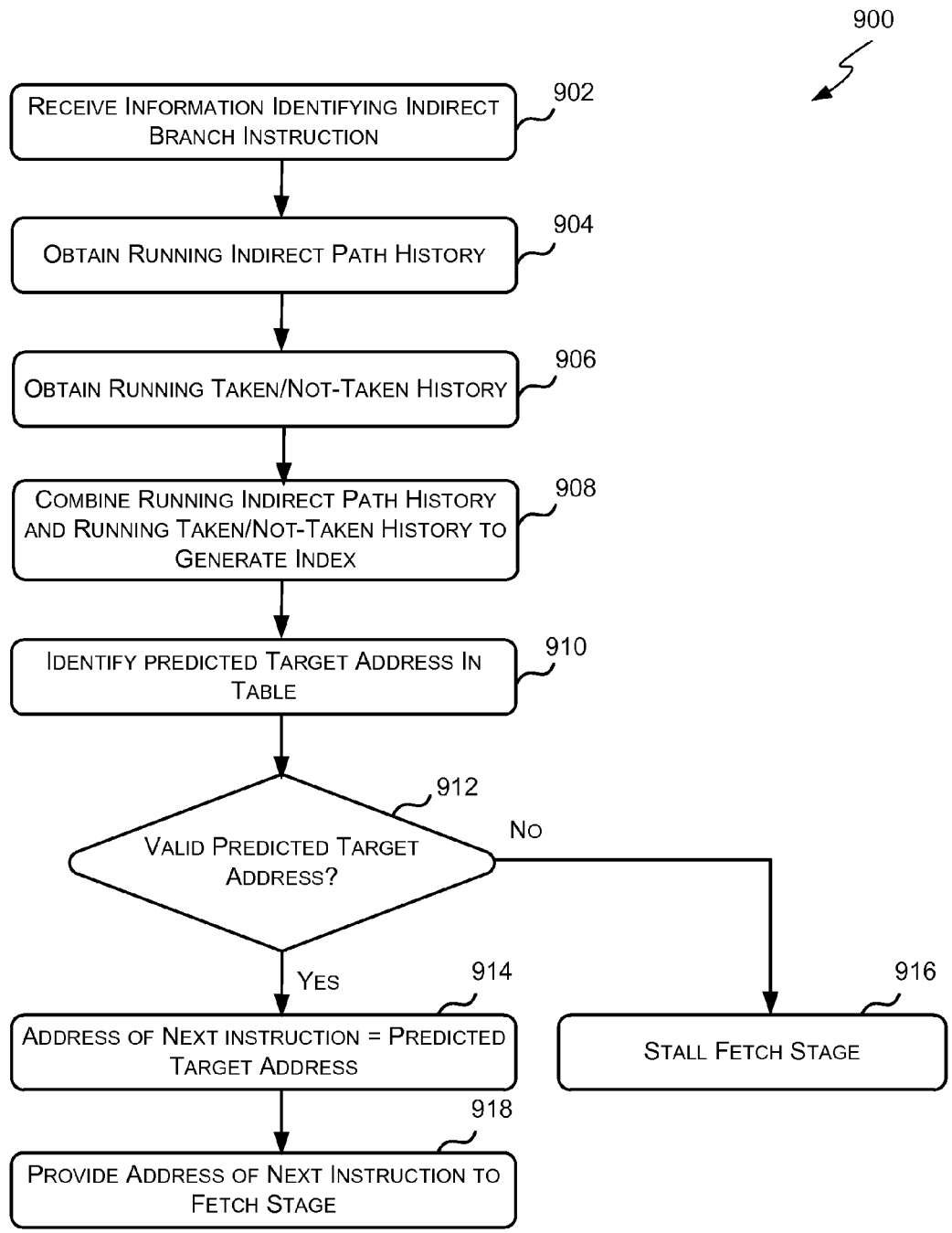
FIG. 9 is a flowchart of an example method for predicting the target address of an indirect branch instruction.

Reference is now made to FIG. 9 which illustrates a method 900, which may be executed by the indirect branch predictor logic unit 314 of FIGS. 3 and 4, for predicting the target address of an indirect branch instruction. At step 902, the indirect branch predictor logic unit 314 (e.g. the index generator 404) receives information from the fetch stage 302 identifying an indirect branch instruction. As described above, the information may comprise the address (e.g. PC) of the indirect branch instruction. Once the information identifying an indirect branch instruction has been received, the method 900 proceeds to step 904.

At step 904, the indirect branch predictor logic unit 314 (e.g. the index generator 404) obtains the running indirect path history 414. As described above the running indirect path history 414 is a history of the predicted target addresses for previously predicted indirect branch instructions. Once the running indirect path history 414 has been obtained, the method 900 proceeds to step 906.

At step 906, the indirect branch predictor logic unit 314 (e.g. the index generator 404) obtains the running taken/not-taken history 416 from the conditional branch predictor logic unit 316. As described above the running taken/not-taken history 416 is a history of the predicted outcomes (taken/not-taken) of previously predicted conditional branch instructions. Once the running taken/not-taken history 416 is obtained the method 900 proceeds to step 908.

At step 908, the indirect branch predictor logic unit 314 (e.g. the index generator 404) combines the running indirect path history 414 and the running taken/not-taken history 416 obtained in steps 904 and 906 respectively to generate an index for the indirect branch instruction that was identified in step 902. As described above, the running indirect path history 414 and the running taken/not-taken history 416 may be combined in any suitable manner to generate the index. In some cases a hash function is performed on a number of bits of the running indirect path history 414 and a number of bits of the running taken/not-taken history 416. For example, a bit-wise exclusive-or (XOR) function may be performed on the running indirect path history 414 and the running taken/not-taken history 416 where each bit of the running indirect path history 414 is XOR'd with a corresponding bit of the running taken/not-taken history 416. It will be evident to a person of skill in the art that other combinations and/or hash functions may be used.

In some cases, the indirect branch predictor logic unit 314 (e.g. the index generator 404) may modify the running indirect path history 414 obtained in step 904 or the running taken/not-taken history 416 obtained in step 906 to include the address (or part thereof) of the indirect branch instruction prior to combining the histories. For example, the indirect branch predictor logic unit 314 may append part of the indirect branch instruction's address to the running indirect path history 414 or running taken/not-taken history 416; or replace part of the running indirect path history 414 or running taken/not-taken history 416 with part of the indirect branch instruction's address.

Once the index has been generated, the method 900 proceeds to step 910.

At step 910, the indirect branch predictor logic unit 314 identifies the predicted target address in the indirect branch predicted target table 402 associated with the index generated in step 908. Once the predicted target address has been identified, the method 900 proceeds to step 912.

At step 912, the indirect branch predictor logic unit 314 (e.g. the decision logic unit 406) determines whether the predicted target address identified in step 910 is valid. If the predicted target address is valid the method proceeds to step 914. If however, predicted target address is not valid the method 900 proceeds to step 916.

At step 914, the indirect branch predictor logic unit 314 (e.g. the decision logic unit 406) predicts the address of the next instruction to be the predicted target address in the indirect branch predicted target table 402 associated with the index generated in step 908. Once the target address for the indirect branch instruction has been predicted, the method 900 proceeds to step 918.

At step 916, the indirect branch predictor logic unit 314 (e.g. the decision logic unit 406) causes the fetch stage 302 to stall until the actual target address is determined by the pipelines 308.

At step 918, the indirect branch predictor logic unit 314 (e.g. the decision logic unit 406) provides the predicted address of the next instruction to the fetch stage 302 which fetches the next instruction from the address provided. The fetch stage 302 may also store the received address (in association with the address of the indirect branch instruction) in an instruction table 422 as described above for use in determining if there has been a mis-prediction.

The indirect branch predictor logic unit 314 (e.g. the decision logic unit 406) may also provide the predicted address of the next instruction to the update logic unit 408 which uses the received address to update the running indirect path history 414 as described above.

Once the predicted address of the next instruction has been provided to the fetch stage 302 the method 900 ends.

Figure 10:
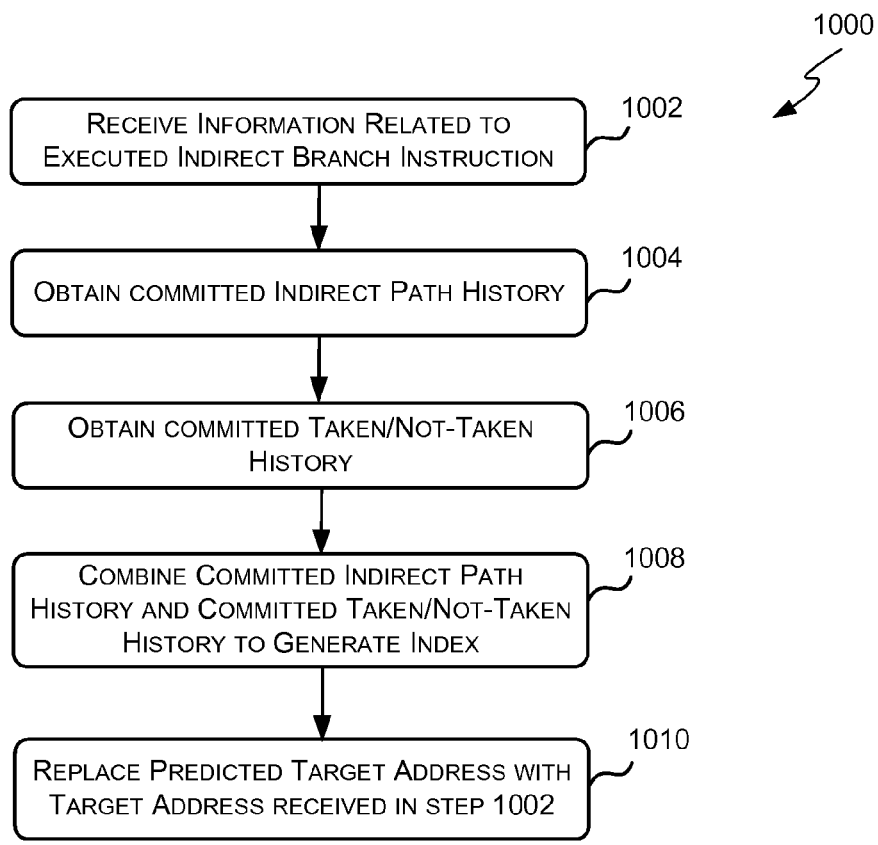
FIG. 10 is a flowchart of an example method for updating an indirect branch predicted target table.

Reference is now made to FIG. 10 which illustrates a method 1000, which may be executed by the indirect branch predictor logic unit 314 of FIGS. 3 and 4, for updating the indirect branch predicted target table 402. At step 1002, the indirect branch predictor logic unit 314 (e.g. the update logic unit 408) receives information from the pipelines 308 relating to an indirect branch instruction that has been executed and committed. The information may comprise the address of the indirect branch instruction and the actual target address of the indirect branch instruction. Once the indirect branch predictor logic unit 314 receives the information related to an executed and committed indirect branch instruction the method 1000 proceeds to step 1004.

At step 1004, the indirect branch predictor logic unit 314 (e.g. the update logic unit 408) obtains the committed indirect path history 418. As described above the committed indirect path history 418 is a listing of the target addresses for the previously executed indirect branch instructions. Once the committed indirect path history 418 has been obtained, the method 1000 proceeds to step 1006.

At step 1006, the indirect branch predictor logic unit 314 (e.g. the update logic unit 408) obtains the committed taken/not-taken history 420 from the conditional branch predictor logic unit 316. As described above the committed taken/not-taken history 420 is a history of the outcomes (taken/not-taken) of the previously executed conditional branch instructions. Once the committed taken/not-taken history 420 is obtained the method 1000 proceeds to step 1008.

At step 1008, the indirect branch predictor logic unit 314 (e.g. the update logic unit 408) combines the committed indirect path history 418 and the committed taken/not-taken history 420 obtained in steps 1004 and 1006 respectively to generate an index for the indirect branch instruction identified in step 1002. As described above, the committed indirect path history 418 and the committed taken/not-taken history 420 may be combined in any suitable manner to generate the index. In some cases a hash function is performed on a number of bits of the committed indirect path history 418 and a number of bits of the committed taken/not-taken history 420. For example, a bit-wise exclusive-or (XOR) function may be performed on the committed indirect path history 418 and the committed taken/not-taken history 420 where each bit of the committed indirect path history 418 is XOR'd with a corresponding bit of the committed taken/not-taken history 420. It will be evident to a person of skill in the art that other combinations and/or hash functions may be used.

In some cases, the indirect branch predictor logic unit 314 (e.g. the update logic unit 408) may modify the committed indirect path history 418 obtained in step 1004 or the committed taken/not-taken history 420 obtained in step 1006 to include the address (or part thereof) of the indirect branch instruction prior to combining the histories. For example, the indirect branch predictor logic unit 314 may append part of the indirect branch instruction's address to the committed indirect path history 418 or committed taken/not-taken history 420; or replace part of the committed indirect path history 418 or committed taken/not-taken history 420 with part of the indirect branch instruction's address.

Once the index has been generated, the method 1000 proceeds to step 1010.

At step 1010, the indirect branch predictor logic unit 314 (e.g. the update logic unit 408) replaces the predicted target address associated with the index generated in step 1008 with the target address received from the pipelines 308. Once the entry in the indirect branch predicted target table 402 has been updated, the method 1000 ends.

As described above, in some cases, the indirect branch predictor 314 (e.g. the update logic unit 408) may also use the information received from the pipelines 308 to update/correct the running indirect path history 414. For example, the indirect branch predictor 314 (e.g. the update logic unit 408) may use the received indirect branch instruction address to compare the actual target address to the predicted target address for the indirect branch instruction. If they match, then the prediction was correct and no update to the running indirect path history 414 is required. If, however, they do not match then there was a mis-prediction and the running indirect path history 414 is replaced by the committed indirect path history 418.

Similarly, the conditional branch predictor 316 may receive information from the pipelines 308 indicating the address of an executed and committed conditional branch instruction and whether or not the branch was taken or not taken (the outcome). The conditional branch predictor 316 may use this information to update/correct the running taken/not-taken history 416. For example, the conditional branch predictor 316 may use the received conditional branch instruction address to compare the actual outcome to the predicted outcome for the conditional branch instruction. If they match, then the prediction was correct and no update to the running taken/not-taken history is required. If, however, they do not match then there was a mis-prediction and the running taken/not-taken history 416 is replaced with the committed taken/not-taken history 420.

Although the examples described herein relate to single-threaded processors, the principles and techniques described herein may be equally applied to multi-threaded processors.

Figure 11:
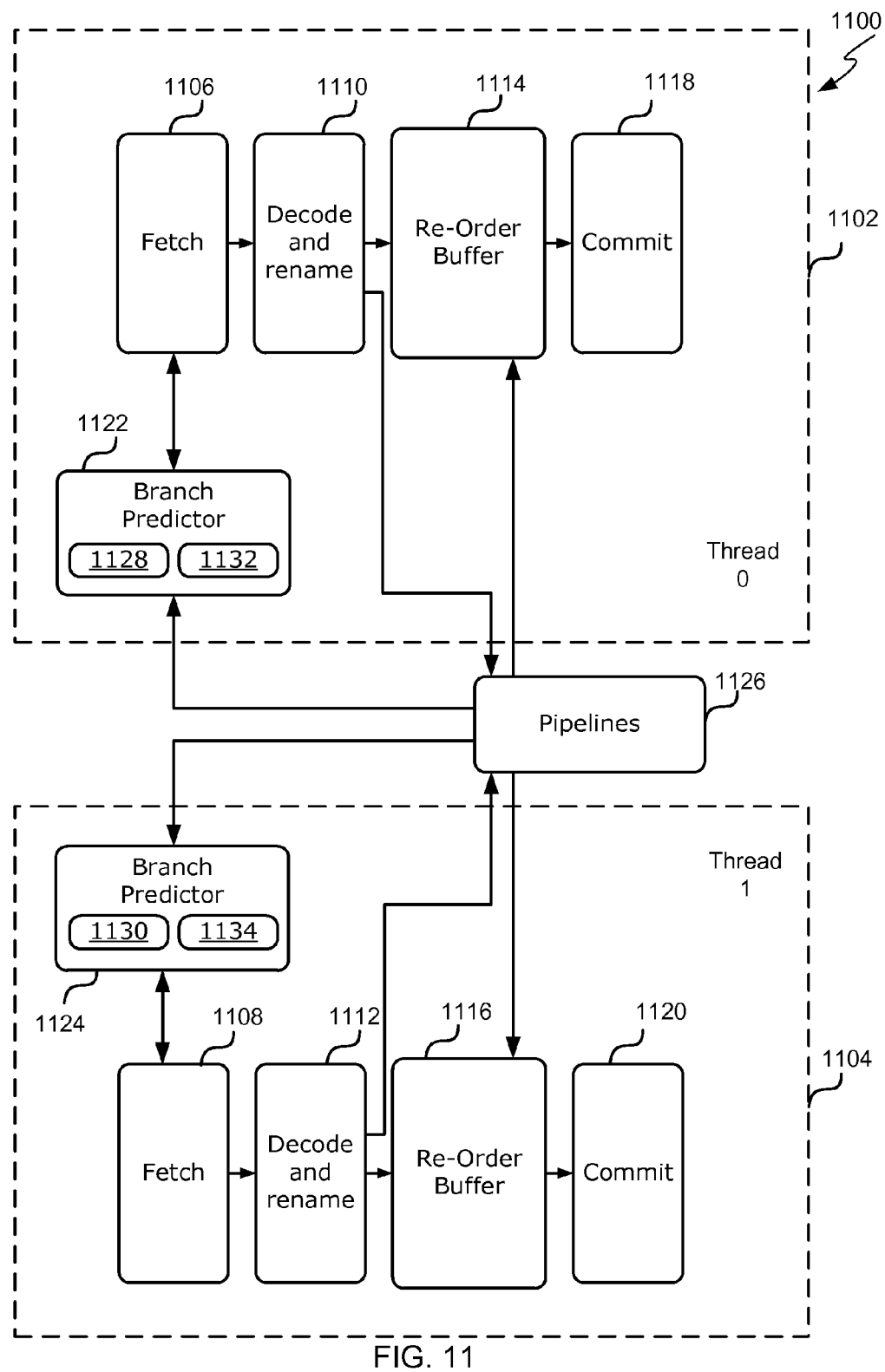
FIG. 11 is a schematic diagram of an example multi-threaded processor.

Reference is now made to FIG. 11 which illustrates a schematic of a multi-threaded out-of order processor 1100. The processor 1100 comprises two threads 1102 and 1104 which will be referred to herein as thread 0 and thread 1 respectively. Each thread 1102 and 1104 comprises a fetch stage 1106 or 1108, a decode and renaming stage 1110 or 1112, a re-order buffer 1114 or 1116, a commit stage 1118 or 1120 and a branch predictor 1122 or 1124 as described above with reference to FIG. 3. The threads 1102 and 1104 share the pipelines 1126 as described above with reference to FIG. 3. Each branch predictor 1122 or 1124 comprises a conditional branch predictor logic unit 1128 or 1130 that generates and stores running and committed taken/not taken histories for the particular thread 1102 or 1102; and an indirect branch predictor logic unit 1132 or 1134 that generates and stores running and committed indirect path histories for the particular thread. Each indirect branch predictor logic unit 1132 and 1134 then uses a combination of the indirect path history and the taken/not-taken history to predict the branch target address as described above with reference to FIGS. 4 to 10. In some cases the branch predictors 1122 or 1124 may maintain and access the same indirect branch predicted target table. In other cases, each branch predictor 1122 or 1124 may maintain and access a separate indirect branch predicted target table.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method to predict a target address of an indirect branch instruction in a program executed by a processor, the method comprising:
storing in an indirect branch predicted target table a plurality of predicted target addresses for indirect branch instructions, each predicted target address being indexed by a combination of an indirect path history and a taken and not-taken history, the indirect path history comprising at least a portion of target addresses for a plurality of previous indirect branch instructions, the taken and not-taken history comprising outcomes for a plurality of previous conditional branch instructions;
receiving at an index generator information identifying an indirect branch instruction, the information identifying the indirect branch instruction comprising an address of the indirect branch instruction;
obtaining at the index generator a running indirect path history and a running taken and not-taken history, the running indirect path history comprising at least a portion of predicted target addresses for a plurality of previously predicted indirect branch instructions, the running taken and not-taken history comprising outcomes for a plurality of previously predicted conditional branch instructions;
amending one of the running indirect path history and the running taken and not-taken history to comprise at least a portion of the address of the indirect branch instruction;
subsequent to the amending, combining at the index generator the running indirect path history and the running taken and not-taken history to generate an index for the identified indirect branch instruction;
identifying a predicted target address in the indirect branch predicted target table using the index for the identified indirect branch instruction; and
if the identified predicted target address is valid, predicting the target address of the identified indirect branch instruction to be the identified predicted target address.

2. The method according to claim 1, wherein combining the running indirect path history and the running taken and not-taken history comprises performing a hashing function on at least a portion of the running indirect path history and at least a portion of the running taken and not-taken history.

3. The method according to claim 2, wherein the hashing function is an exclusive-OR function.

4. The method according to claim 1, further comprising:
receiving at an update logic unit information related to an executed indirect branch instruction, the information related to the executed indirect branch instruction comprising an actual target address for the executed indirect branch instruction; and
at the update logic unit, updating the indirect branch predicted target table based on the actual target address.

5. The method according to claim 4, wherein updating the indirect branch predicted target table comprises:
obtaining at the update logic unit a committed indirect path history and a committed taken and not-taken history;
combining at the update logic unit the committed indirect path history and the committed taken and not-taken history to generate an index for the executed indirect branch instruction;
identifying a predicted target address of the indirect branch predicted target table using the index for the executed indirect branch instruction; and
replacing the predicted target address identified by the index for the executed indirect branch instruction with the actual target address for the executed indirect branch instruction.

6. The method according to claim 5, wherein the committed indirect path history comprises at least a portion of actual target addresses for a plurality of previously executed indirect branch instructions.

7. The method according to claim 5, wherein the committed taken and not-taken history comprises outcomes for a plurality of previously executed conditional branch instructions.

8. The method according to claim 1, further comprising if the identified predicted target address is not valid, stalling a fetch stage of the processor.

9. The method according to claim 1, wherein generating the index for the identified indirect branch instruction comprises combining only the running indirect path history and the running taken and not-taken history.

10. An indirect branch predictor logic unit to predict a target address of an indirect branch instruction in a program executed by a processor the indirect branch predictor logic unit comprising:
an indirect branch predicted target table configured to store a plurality of predicted target addresses for indirect branch instructions, each predicted target address being indexed by a combination of an indirect path history and a taken and not-taken history, the indirect path history comprising at least a portion of target addresses for a plurality of previous indirect branch instructions, the taken and not-taken history comprising outcomes for a plurality of previous conditional branch instructions;
an index generator in communication with the indirect branch predicted target table, the index generator configured to:
receive information identifying an indirect branch instruction, the information identifying the indirect branch instruction comprising an address of the indirect branch instruction;
obtain a running indirect path history and a running taken and not-taken history, the running indirect path history comprising at least a portion of predicted target addresses for a plurality of previously predicted indirect branch instructions, the running taken and not-taken history comprising outcomes for a plurality of previously predicted conditional branch instructions;
amend one of the running indirect path history and the running taken and not-taken history to comprise at least a portion of the address of the indirect branch instruction; and
subsequent to the amendment, combine the running indirect path history and the running taken and not-taken history to generate an index for the identified indirect branch instruction; and
a decision logic unit in communication with the indirect branch predicted target table, the decision logic unit configured to:

identify a predicted target address of the indirect branch predicted target table using the index for the identified indirect branch;

if the identified predicted target address is valid, predict the target address of the identified indirect branch instruction to be the identified predicted target address.

11. The indirect branch predictor logic unit according to claim 10, wherein combining the running indirect path history and the running taken and not-taken history comprises performing a hashing function on a least a portion of the running indirect path history and at least a portion of the running taken and not-taken history.

12. The indirect branch predictor logic unit according to claim 11, wherein the hashing function is an exclusive-OR function.

13. The indirect branch predictor logic unit according to claim 10, further comprising an update logic unit in communication with the indirect branch predicted target table, the update logic unit configured to:

receive information related to an executed indirect branch instruction, the information related to the executed indirect branch instruction comprising an actual target address for the executed indirect branch instruction; and update the indirect branch predicted target table based on the actual target address.

14. The indirect branch predictor logic unit according to claim 13, wherein updating the indirect branch predicted target table comprises:

obtaining a committed indirect path history and a committed taken and not-taken history;

combining the committed indirect path history and the committed taken and not-taken history to generate an index for the executed indirect branch instruction;

identifying a predicted target address of the indirect branch predicted target table using the index for the executed indirect branch instruction; and replacing the predicted target address identified by the index for the executed indirect branch instruction with the actual target address for the executed indirect branch instruction.

15. The indirect branch predictor logic unit according to claim 14, wherein the committed indirect path history comprises at least a portion of actual target addresses for a plurality of previously executed indirect branch instructions.

16. The indirect branch predictor logic unit according to claim 14, wherein the committed taken and not-taken history comprises outcomes for a plurality of previously executed conditional branch instructions.

17. The indirect branch predictor logic unit according to claim 10, wherein the decision logic unit is further configured to, if the identified predicted target address is not valid, stall a fetch stage of the processor.

18. The indirect branch predictor logic unit according to claim 10, wherein the index generator is configured to generate the index for the identified indirect branch instruction by combining only the running indirect path history and the running taken and not-taken history.

19. A non-transitory computer readable storage medium having encoded thereon computer readable program code for generating a processor comprising the indirect branch predictor logic unit of claim 10.

20. A non-transitory computer readable storage medium having encoded thereon computer readable program code for generating a processor configured to perform a method comprising:

storing in an indirect branch predicted target table a plurality of predicted target addresses for indirect branch instructions, each predicted target address being indexed by a combination of an indirect path history and a taken and not-taken history, the indirect path history comprising at least a portion of target addresses for a plurality of previous indirect branch instructions, the taken and not-taken history comprising outcomes for a plurality of previous conditional branch instructions;

receiving at an index generator information identifying an indirect branch instruction, the information identifying the indirect branch instruction comprising an address of the indirect branch instruction;

obtaining at the index generator a running indirect path history and a running taken and not-taken history, the running indirect path history comprising at least a portion of predicted target addresses for a plurality of previously predicted indirect branch instructions, the running taken and not-taken history comprising outcomes for a plurality of previously predicted conditional branch instructions;

amending one of the running indirect path history and the running taken and not-taken history to comprise at least a portion of the address of the indirect branch instruction;

subsequent to the amending, combining at the index generator the running indirect path history and the running taken and not-taken history to generate an index for the identified indirect branch instruction;

identifying a predicted target address in the indirect branch predicted target table using the index for the identified indirect branch instruction; and if the identified predicted target address is valid, predicting the target address of the identified indirect branch instruction to be the identified predicted target address.

* * * * *